March 4, 1924.
T. O'MALLEY
FLOATING FISH TRAP
Filed May 5, 1923   2 Sheets-Sheet 2
1,485,875
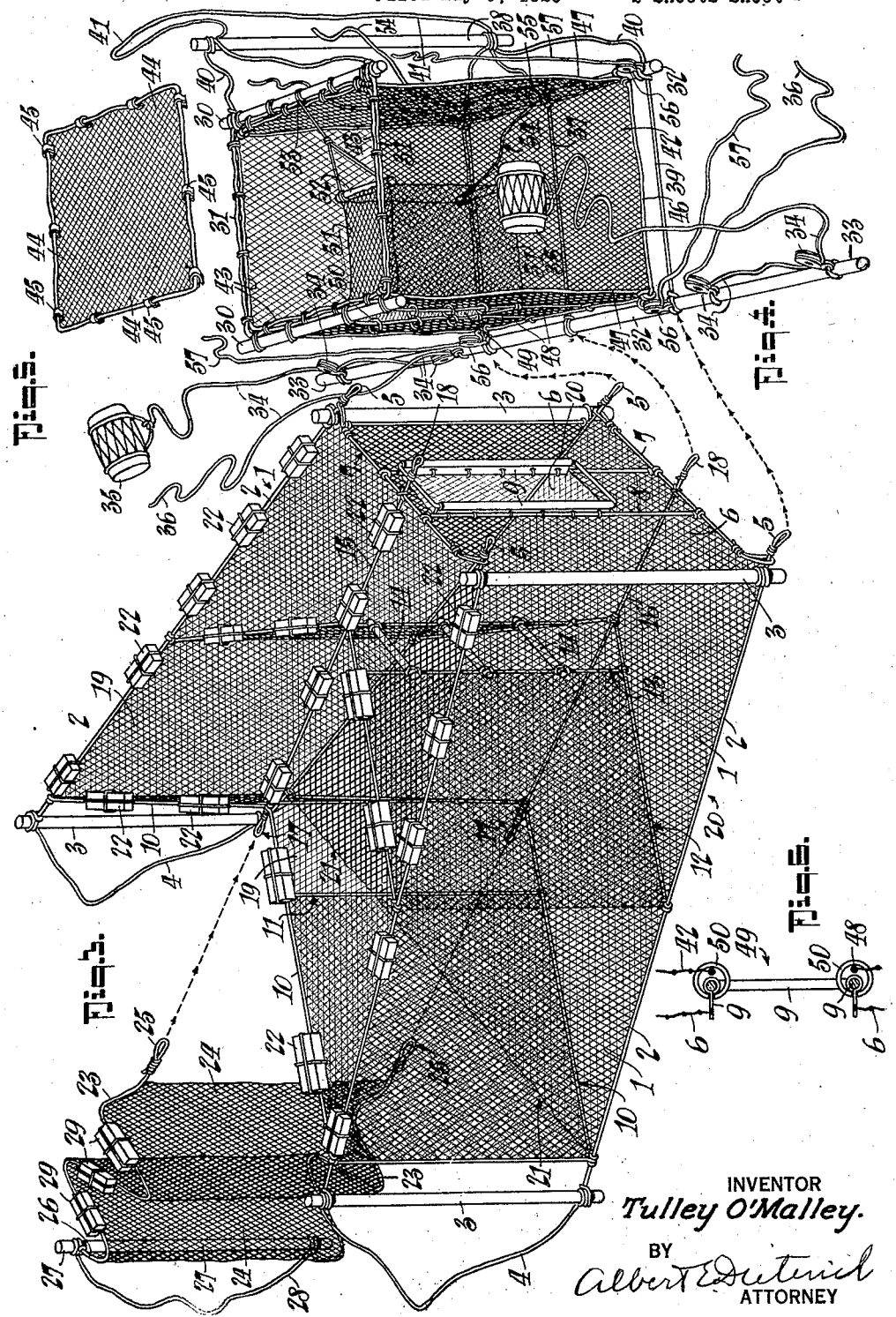
INVENTOR
*Tulley O'Malley.*
BY
ATTORNEY Patented Mar. 4, 1924.

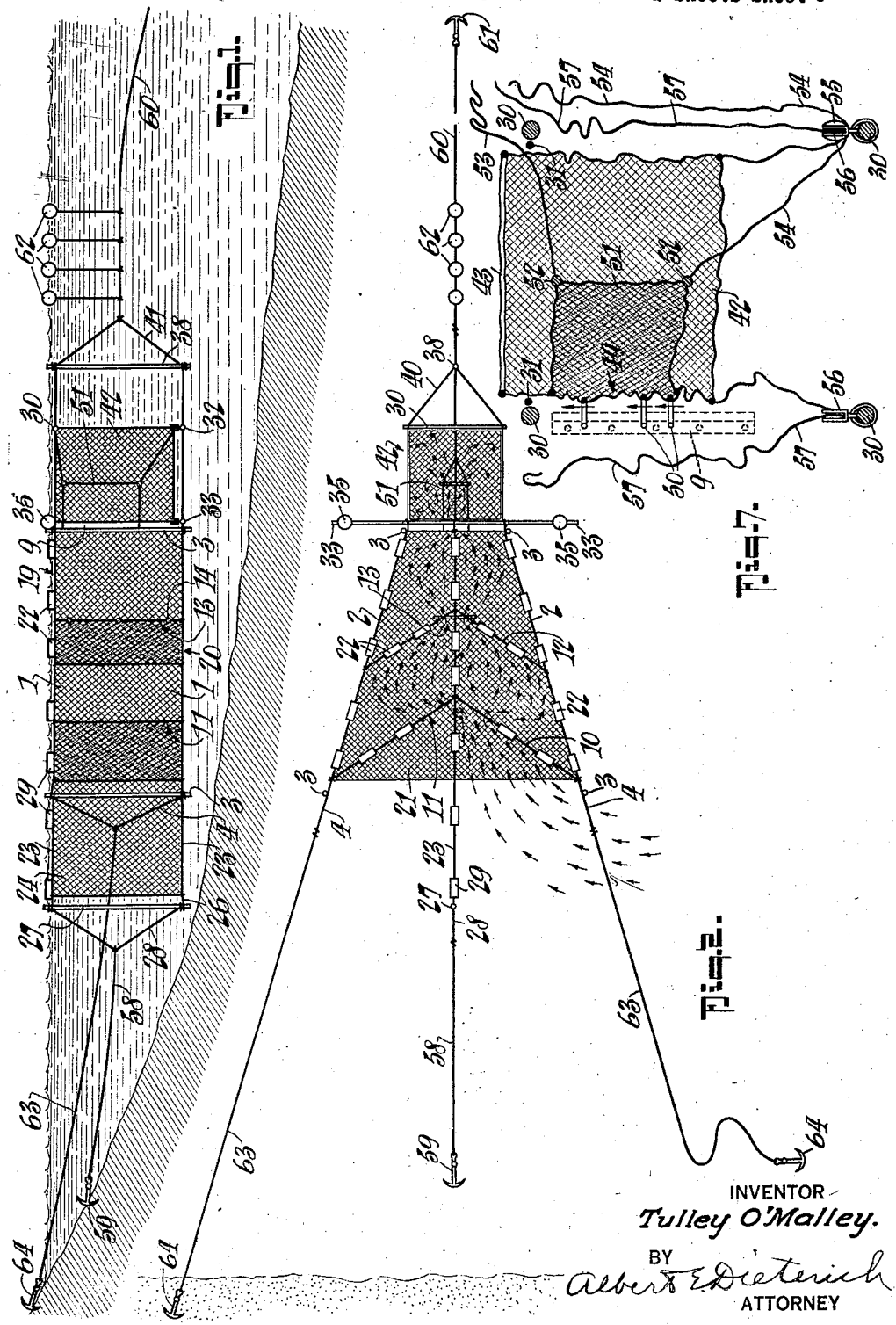

1,485,875

UNITED STATES PATENT OFFICE.

TULLEY O'MALLEY, OF CORDOVA, TERRITORY OF ALASKA.

FLOATING FISH TRAP.

Application filed May 5, 1923. Serial No. 636,967.

*To all whom it may concern:*

Be it known that I, TULLEY O'MALLEY, born a subject of the King of Great Britain and Ireland (but who has declared his intention to become a citizen of the United States), residing at Cordova, Territory of Alaska, have invented a new and useful Improvement in Floating Fish Traps, of which the following is a specification.

The invention resides in the provision of a new and improved fish trap wherein is embodied means for effectively guiding the fish into the trap, for properly anchoring the same the desired distance and position from the shore for effecting the fishing operation, and for the proper emptying thereof at desired intervals.

The invention has for its object to provide a new and improved construction of fish trap wherein is embodied means for positioning the trap in a simple and effective manner with its longitudinal axis at approximate right angles from the shore line, for effectively guiding the fish into the trap portion, for quickly and conveniently emptying the trap of the trapped fish and for preventing lateral displacement and rolling of the same.

The invention further has for its object the provision of means whereby the trap may be constructed in units or sections so that any one or more of the units, becoming worn, may be readily replaced as a complete unit without necessarily disturbing the trap as a whole.

With the above, and other objects in view, which will be hereinafter fully described, the invention resides in those novel details of construction, combination and arrangement of parts all of which will be fully described, then be specifically pointed out in the appended claims and illustrated in the accompanying drawings, in which:

Figure 1 is a diagrammatic longitudinal section of my trap in operation.

Figure 2 is a similar view showing the invention in plan.

Figure 3 is a detail perspective view of the main body portion of the trap unit and the central lead unit, the latter being separated from the former.

Figure 4 is a detail perspective view of the spiller unit and illustrates the spiller and its cooperative mounting.

Figure 5 is a detail perspective view of the cover for the open top of the spiller body.

Figure 6 is a diagrammatic horizontal section illustrating the slidable connection between the openings of the main body and the spiller.

Figure 7 is a diagrammatic central section of the spiller and illustrates the manner in which the same is operated in effecting the emptying of the trap.

In the drawings, in which like numerals of reference indicate like parts in all of the figures, I have illustrated my invention as manufactured in four distinct elements so that the same may be readily replaced when in need of repairs without affecting the remainder of the trap units. I have divided the invention as follows: A main body portion, a central lead portion, a spiller and the mounting therefor and the anchoring means. Each of these units will be described in the above order.

The main body portion includes side portions 1 gradually converging seaward and which are bound by upper and lower border ropes 2 held properly spaced at their ends by corner spacer poles 3 to which they are fixedly lashed in any desired manner. The border ropes 2 after being lashed to the spacer poles 3 extend shoreward to form connecting loops 4 and seaward to form connecting loops 5. The side portions 1 at their seaward end merge with a rear wall 6 which is bound by upper and lower border ropes 7 and which includes medial strengthening ropes 8 which provide means for mounting a metal discharge throat 9, hereinafter again referred to.

I provide the main body portion with a pair of oppositely disposed leads 10 which converge toward each other in a seaward direction to provide for effectively guiding the fish into the heart of the trap body, and the converging net portions of the said leads are spaced apart to form a doorway 11. Other opposite leads 12 are provided, properly spaced from those 10, and which converge in a like manner to provide a trapping doorway 13 which aligns with the doorway 11 of the leads 10 but which is of less width. The smaller doorway 13 may be properly held open by cross bars 14. The main body portion of the trap also includes an upper medial trap supporting rope 15 and a lower medial trap supporting rope 16 and each of said ropes, extending centrally of the trap body, projects slightly beyond the converging points of the leads 10 to form connecting loops 17, and similarly at their seaward ends to form similar loops 18.

The body portion includes a top portion 19 which conforms in shape to the border formed by the upper ropes 2, 7 and those of the leads 10, and 20 designates the bottom portion which is similar in shape to the top except that it extends at 21 to a line approximating the point at which the leads 10 join the loops 2. All of the various top border ropes 15, 2, 10, 12 are provided with floats 22 for properly holding the trap in the desired submerged position with the top portion thereof at the water surface (see Figures 1 and 3).

The main or central lead member includes upper and lower border ropes 23 for carrying the net portion 24 and the said main lead is made of any length as is desired to suit the conditions. It may extend shoreward any desired length but the seaward end thereof is designed to cooperate with the door 11 formed by the leads 10, as is clearly shown in Figures 2 and 3. The border ropes 23 are extended seaward beyond the net 24 and are provided with loop portions 25 adapted to be joined with the loops 17 of the ropes 15 and 16 of the main body hereinbefore described. The said ropes 23 extend shoreward slightly beyond the net 24, as at 26, where they are fixedly lashed to a spacer pole 27 adapted to hold the said main lead member in proper spaced position, and the said ropes 23 further extend shoreward to provide a connecting loop 28. The upper border rope 23 is provided with a plurality of float members 29 (see Figures 1, 2 and 3).

In the practical development of my spiller and the mounting therefor, I provide a pair of upper horizontal spacer poles 30 to which are securely lashed two of the sides of a substantially square spiller body supporting border rope 31. Lower horizontal spaced poles 32 are provided and the one thereof which is the nearest to the shore is provided with end extensions 33, with pulley and rope connections 34 and the one end of the said rope of each end extension is secured to a float member, while the other or loose end 36 is adapted to be utilized in effecting adjustment of the float with relation to the said spacer pole 32 to prevent rolling of the trap in a manner hereinafter referred to.

37 designates a central connecting rope fixed to the lower horizontal spacer poles 32 and extending in the seaward direction beyond the said poles to be securely lashed to a vertical centrally disposed spacer pole 38. Bottom side ropes 39 are securely lashed to the said poles 32, see Figure 4, and the said ropes 39 extend beyond in a seaward direction to the poles 32 and converge to be securely lashed to the pole 38 from whence they further extend to form a connecting loop 41. The upper end of the pole 38 is secured to the upper horizontal spacer pole 30 nearest thereto through the means of the converging rope connections 40.

The spiller body 42 is suspended from a rope 43 which forms a border for the open top of the same, which said rope 43 is securely lashed to the border rope 31 in turn securely lashed to the horizontal spacer poles 30, as hereinbefore described. The open top of the spacer is suitably covered during the fishing operation by a cover 44 which is provided with securing means 45 in the nature of snap fasteners for engaging the border ropes 31 and 43. It will be readily understood that the corner loop connections of the cover 44 may be dispensed with, if desired, so that the said cover will be secured only to the border loop 43 of the spiller body, so that the cover may be left on the spiller body and the whole removed intact to be later opened and emptied, as desired. The spiller body 42 is further bound and strengthened by a bottom border rope 46, corner ropes 47 and medial ropes 48, the latter being designed to strengthen the opening 49, of the said spiller body, which is adapted to register with the metal throat 9 of the main trap body.

By reference to Figures 3 and 6, it will be noticed that the metal throat 9 of the main body is in the nature of a wire frame with straight metal sides having apertures adapted to facilitate lashing to the ropes 8, as shown in the said figures, and with guiding track portions surrounding the said wire frame at the sides for forming a proper guideway for the open connecting rings 50 secured to the ropes 48 bounding the opening 49 to the spiller. When the parts just described are cooperatively joined, as illustrated in Figure 6, the rings 50 slidably engage the metal throat 9 in a manner whereby the said throatway is held in communication with the opening 49 into the spiller, when the parts are in operative condition, and which permit upward sliding and removal therefrom of the said ring connections when the spiller body is being removed in effecting the emptying of the trapped fish. A tunnel 51 extends from the spiller opening 49 inwardly into the said spiller and, for properly holding the said tunnel open in operative position, and for permitting the collapsing thereof when the spiller is being emptied, I provide upper and lower spacer rods 52, the upper one thereof being secured as at 53 to the seaward pole 30, and the lower one thereof being adjustably secured by a rope 54 which takes over a sheave block 55 secured centrally to the seaward one of the lower spacer poles 32 and upward so that its free end may be securely fixed adjacent the connection 53. In this manner the tunnel may be held open during the operation of fishing to permit the ready entry of the fish from the heart of the trap into the spiller body and may be allowed to collapse to form a vertical closure of the opening 49 so as to prevent any of the trapped fish from escaping therethrough while the spiller body is being removed to be emptied.

For properly effecting the convenient emptying of the trapped fish within the spiller, I provide sheave blocks 56 secured to the lower spacer poles 32, and adjusting rope connections 57, one end thereof being secured to the respective bottom corner of the spiller body 42, and being extended around the sheave block 56 and upward to the respective pole end 30 and where it may be fixed thereto when the parts are in operative condition. It will be readily understood that by drawing these four rope ends taut and securing the said ends thereof to the spacer poles 30, the bottom corners of the spiller will be securely held down thereby to effectively hold the spiller body 42 in its operative condition, see Figure 4. It will also be obvious that by untying the ends, as is shown in Figure 4, and disconnecting whatever lashing means is used for securing the border rope 43 of the spiller body 42 with the supporting border rope 35 therefor, the whole boly portion 42 of the spiller may be entirely removed from its mounting to effect the proper emptying of the trapped fish contained therein, (it being understood that the connections 53 and 54 for holding the tunnel taut have previously been released). It will also be apparent that in thus removing the spiller body the open ring connections 50 ride up the guiding portions of the metal throatway 9 and are slipped off the top portion thereof, that the entire body may be removed and placed upon a boat and taken to a distant place to be removed, or may be but partially removed to effect the emptying thereof, that is by removing the said spiller body only such distance through the top border 31 as is necessary to effect the emptying thereof into a convenient boat, in which case the rope connections 57 and 53 will be provided with sufficient surplus so that they will remain in operative relation with their respective pulleys to effect the ready readjustment of the spiller body to its operative relation.

It will be readily understood by reference to Figures 3 and 4 that when the main body unit is cooperatively joined with the spiller body mounting, the connecting loops 5 and 18 of the upper portion of the trap body will be securely lashed to the adjacent spacer pole 30 of the said mounting, while the connecting loops 5 and 18 of the lower portion of the trap body will be securely lashed, at the points indicated by dotted lines, to the adjacent spacer pole 32.

In the practical development of my anchoring means whereby the trap is suitably anchored, the desired distance from the shore and in the desired relation thereto, I provide a shorewardly extended central anchoring means in the nature of a rope or cable 58 lashed in any desired manner to the connecting loop 28 provided at the shoreward end of the main or central lead member. The said anchoring means extends shoreward in longitudinal alignment with the axis of the trap body and is provided at its end with an anchoring means 59 so that the same may cooperate with a seawardly extended anchoring means 60 lashed in any desired way to the connecting loop 41, hereinbefore referred to, and also provided with an anchoring means 61, for effecting the desired anchoring of the trap body through its longitudinal axis.

The last named anchoring means 60 is provided with a plurality of float members 62 adapted to support that end of the said anchoring means 60 which is adjacent the trap so as to hold the said anchoring means in the proper cooperative relation with the said trap body. While it is desired that the shoreward end of the trap, the medial spacer pole 27 thereof, be positioned at a point approximating the low water mark (that is, the point at which the length of the pole 27 will approximate the depth of the water at low tide) it will be readily understood that the trap may be positioned a greater distance from the shore, in which case float members may also be used in connection with the line 58 if it should be found necessary to supplement the function of the floats 29 which support the main central lead net 24.

It will be readily understood that when the units thus far described have been cooperatively joined, the anchoring line 58, the border ropes 23, the ropes 15 and 16, the ropes 37, 39, 40 and the anchoring line 60, form what might be termed a main anchoring line projecting through the central vertical plane or axis of the trap proper so as to form a practical means for holding the trap positioned in the desired line (controlled by the position of the anchors 59 and 60).

For securing the shoreward end of the trap body I provide a pair of anchoring lines 63 which may be lashed in any way desired to the connecting loops 4 of the trap body sides 1 and which extend shoreward in an angled direction and which are provided with anchoring means 64 to effect the proper anchoring of the said lines to hold the said open end of the trap body in operative condition.

It will also be understood that the anchoring ends of all of the various lines 63, 60 and 58 may be provided with chain portions or cable lengths spliced thereinto to prevent wear, due to slight shifting on the sand.

By reason of the anchoring means before described, it will be readily understood that the trap is fixedly positioned the desired distance from the shore, in the desired longitudinal relation with the shore, and in the desired condition for effecting, practically the operation for which it is designed, and the said trap is suspended from the surface of the water, and in a manner which prevents lateral rolling, by float members, as before described.

It will be apparent from Figures 1, 2 and 4 that when the parts are operatively connected and anchored, as shown in the said Figures 1 and 2, the float members 35 through their rope and pulley connections 34, with the extended ends 33 of the shoreward spacer pole 32, overcome any tendency of the trap to roll laterally, it being understood that the free ends 36 of the rope connections 34 are securely fixed to either the top of the respective seaward pole 3 or the spacer pole 30, as may be desired.

From the foregoing description, taken in connection with the accompanying drawings, it is thought the complete construction, operation and advantages of my invention will be readily apparent to those skilled in the art.

The present application discloses matter in common between it and my previous application filed February 14, 1921, Serial No. 444,786.

What I claim is:

1. A trap comprising a trap body having an entrance and an exit, leads having aligning openings and extending inward from said entrance, shore lines for anchoring the entrant end to the shore, a main carrying "line" extending longitudinally through the central vertical plane of the trap body and being secured to said leads, buoyant members on said line, a lead forming portion in said line, anchors at the "line" ends, and spacer poles for holding portions of the trap body properly spaced, at least one of said poles being provided with end extensions and adjustable floats, and a spiller removably cooperative with said trap body.

2. A trap, comprising a trap body having an entrance and an exit, leads in said trap body, a spiller removably cooperative with the exit of the said trap body, spacer poles for holding portions of the trap body properly spaced, at least one of said poles being provided with end extensions and adjustable floats for preventing lateral rolling of the said trap body, means for anchoring the trap in proper position, said means comprising a main carrying line extending through the central vertical plane of the trap body and being secured to the converging points of said leads, including a main central lead portion, and having means at its opposite ends whereby it may be anchored for locating the trap in proper position and buoyant members thereon.

3. A trap, comprising a trap body having an entrance at one end and an exit at the other end, a metal throatway bordering said exit, leads extending inward of the entrant end of said trap body and spaced to provide aligning openings, a spiller body, a supporting mounting therefor, having an opening therein, open rings secured to said spiller body for slidably engaging the metal throatway, a tunnel adapted normally to register with the said metal throatway and projecting inwardly into the spiller body, means for holding the spiller body taut, means for holding the tunnel taut, and means for anchoring the trap in proper position.

4. A trap, comprising a trap body having an entrance at one end and an exit at the other end, a metal throatway bordering said exit, leads extending inward of the entrant end of said trap body and spaced to provide aligning openings, a spiller body, a supporting mounting therefor, having an opening therein, open rings secured to said spiller body for slidably engaging the metal throatway, a tunnel adapted normally to register with the said metal throatway and projecting inwardly into the spiller body, means for holding the spiller body taut, means for holding the tunnel taut, means for anchoring the trap in proper position, said means comprising a main carrying line extending through the central vertical plane of the trap body, including a main central lead portion, and having means at its opposite ends whereby it may be anchored for locating the trap in proper position and buoyant members thereon.

5. A trap, comprising a trap body having an entrance at one end and an exit at the other end, a metal throatway bordering said exit, leads extending inward of the entrant end of said trap body and spaced to provide aligning openings, a spiller body, a supporting mounting therefor, having an opening therein, open rings secured to said spiller body for slidably engaging the metal throatway, a tunnel adapted normally to register with the said metal throatway and projecting inwardly into the spiller body, means for holding the spiller body taut, means for holding the tunnel taut, means for anchoring the trap in proper position, said means comprising a main carrying line extending through the central vertical plane of the trap body, including a main central lead portion, having means at its opposite ends whereby it may be anchored for locating the trap in proper position and buoyant members thereon, spacer poles for holding portions of the trap body properly spaced, at least one of said poles being provided with end extensions and adjustable floats for preventing lateral rolling of the said trap body.

6. A trap comprising the following separable units of construction; a main body including leads, an entrant end, an exit end, float members, and connecting loops; a main lead member including floats and connecting loops; a spiller mounting, carrying a removable spiller having an opening, and including connecting loops; and anchoring means for holding the assembled trap in proper position and which includes shore lines and main centrally disposed carrying lines, at least one of which is provided with float members.

7. A trap, comprising a trap body having an entrant end and an exit end, leads in said trap body, a spiller body, a mounting for said spiller body, a tunnel in said spiller body adapted to be normally in communication with the exit of the trap body, means for holding the spiller body taut, means for holding the tunnel taut, means for slidably and removably joining the entrant end of the tunnel with the exit of the trap body, and means for anchoring the trap in proper position.

8. A trap comprising a trap body having an entrant end and an exit end, leads in said trap body, a spiller body, a mounting for said spiller body, a tunnel in said spiller body adapted to be normally in communication with the exit of trap body, means for holding the spiller body taut, means for holding the tunnel taut, means for slidably and removably joining the entrant end of the tunnel with the exit of the trap body, means for anchoring the trap in proper position, said means comprising a main carrying line extending through the central vertical plane of the trap body, including a main central lead portion, and having means at its opposite ends whereby it may be anchored for locating the trap in proper position and buoyant members thereon.

9. A trap, comprising a trap body having an entrant end and an exit end, leads in said trap body, a spiller body, a mounting for said spiller body including spacer poles, adjustable floats cooperative with at least one of said poles, a tunnel in said spiller body adapted to be normally in communication with the exit of the trap body, means for holding the spiller body taut, means for holding the tunnel taut, means for slidably and removably joining the entrant end of the tunnel with the exit of the trap body, means for anchoring the trap in proper position, said means comprising a main carrying line extending through the central vertical plane of the trap body, including a main central lead portion, and having means at its opposite ends whereby it may be anchored for locating the trap in proper position and buoyant members thereon.

TULLEY O'MALLEY.